(12) United States Patent
Korst et al.

(10) Patent No.: US 9,967,625 B2
(45) Date of Patent: May 8, 2018

(54) METHOD AND APPARATUS FOR AUTOMATIC GENERATION OF RECOMMENDATIONS

(75) Inventors: Jan Korst, Eindhoven (NL); Mauro Barbieri, Eindhoven (NL); Ramon Antoine Wiro Clout, Eindhoven (NL); Serverius Petrus Paulus Pronk, Vught (NL)

(73) Assignee: Funke Digital TV Guide GmbH, Berlin (DE)

( * ) Notice: Subject to any disclaimer, the term of this patent is extended or adjusted under 35 U.S.C. 154(b) by 492 days.

(21) Appl. No.: 14/239,380

(22) PCT Filed: Sep. 4, 2012

(86) PCT No.: PCT/EP2012/067227
§ 371 (c)(1),
(2), (4) Date: Feb. 18, 2014

(87) PCT Pub. No.: WO2013/034553
PCT Pub. Date: Mar. 14, 2013

(65) Prior Publication Data
US 2014/0223488 A1     Aug. 7, 2014

(30) Foreign Application Priority Data

Sep. 8, 2011  (EP) .................................. 11180631.1

(51) Int. Cl.
*G06F 17/30*   (2006.01)
*H04N 21/466*  (2011.01)
*H04N 21/482*  (2011.01)

(52) U.S. Cl.
CPC ... *H04N 21/4668* (2013.01); *G06F 17/30867* (2013.01); *H04N 21/4828* (2013.01)

(58) Field of Classification Search
CPC ............. H04N 21/466; H04N 21/4668; H04N 21/482; H04N 21/4826; H04N 21/4828; G06F 17/30867
See application file for complete search history.

(56) References Cited

U.S. PATENT DOCUMENTS

2004/0128301 A1*  7/2004  Thint ................ G06F 17/30867
2004/0194141 A1*  9/2004  Sanders ............ G06F 17/30817
                                                          725/53

(Continued)

FOREIGN PATENT DOCUMENTS

CN   101019118 A   8/2007
CN   101164067 A   4/2008

(Continued)

OTHER PUBLICATIONS

Chumki Basu et al.: "Technical Paper Recommendation: A study in Combining Multiple Information Sources;" Journal of Artificial Intelligence Research 1; Jan. 1, 2001; pp. 231-252.*

(Continued)

*Primary Examiner* — Benjamin R Bruckart
*Assistant Examiner* — Jen-Shi Huang
(74) *Attorney, Agent, or Firm* — Ware, Fressola, Maguire & Barber LLP

(57) ABSTRACT

A recommender engine for recommending content items to a user comprises a profile generation unit having a pre-profile input unit, which is configured to receive pre-profile data comprising pre-profile text data suitable for identifying entities of interest to a given user, and having a pre-profile analysis unit, the entities of interest and to generate an initial user profile data set for the given user from the extracted identification data; a query generation unit, to generate at least two queries semantically different from each other to be directed to at least one content repository; a content retrieval unit, to issue the generated queries to the content repository (Continued)

and to receive in response to the queries, content-related response data comprising respective hit lists and an interleaver unit to generate from the different hit lists a single recommendation list.

14 Claims, 2 Drawing Sheets

(56) References Cited

U.S. PATENT DOCUMENTS

| | | | | |
|---|---|---|---|---|
| 2005/0172318 A1* | 8/2005 | Dudkiewicz | ...... | G06F 17/30017 725/46 |
| 2008/0104127 A1* | 5/2008 | Billmaier | .......... | G06F 17/30029 |
| 2008/0288982 A1* | 11/2008 | Pronk | ................ | H04N 21/4147 725/46 |
| 2009/0328105 A1* | 12/2009 | Craner | .............. | G06F 17/30997 725/46 |
| 2010/0004975 A1 | 1/2010 | White et al. | | |
| 2012/0143911 A1* | 6/2012 | Liebald | ............. | G06F 17/30702 707/771 |
| 2013/0097153 A1* | 4/2013 | Barbieri | ............ | G06F 17/30817 707/722 |

FOREIGN PATENT DOCUMENTS

| | | |
|---|---|---|
| CN | 101361068 A | 2/2009 |
| RU | 2420908 C2 | 6/2011 |

OTHER PUBLICATIONS

Chumki Basu, et al.; "Technical Paper Recommendation: A Study in Combining Multiple Information Sources;" Journal of Artificial Intelligence Research 1; Jan. 1, 2001; pp. 231-252.

T.P. Liang, et al; "A Semantic-Expansion Approach to Personalized Knowledge Recommendation;" Decision Support systems, Elsevier Science Publishers, Amsterdam, NL; vol. 45, No. 3; Jun. 1, 2008; pp. 401-412.

* cited by examiner

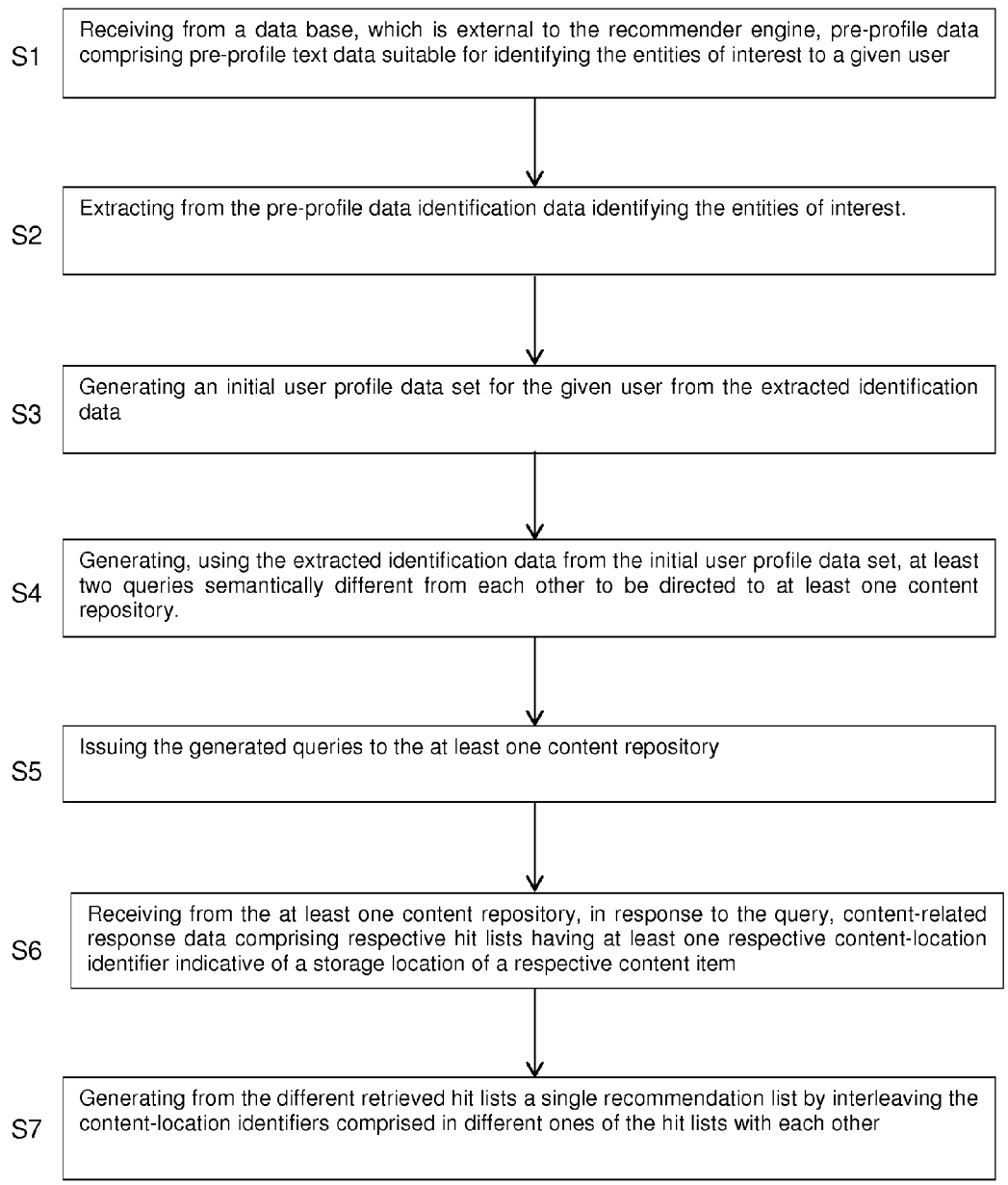

METHOD AND APPARATUS FOR AUTOMATIC GENERATION OF RECOMMENDATIONS

CROSS REFERENCE TO RELATED APPLICATIONS

This application is the U.S. National Stage of International Application Number PCT/EP2012/067227 filed on Sep. 4, 2012 which application claims priority under 35 USC § 119 to European Patent Application No. 11180631.1 filed on Sep. 8, 2011. Both applications are hereby incorporated by reference in their entirety.

TECHNICAL FIELD

The present invention relates to a recommender engine for recommending content items to a user, a content repository, a method for operating a recommender engine for recommending content items to a user, and to a computer-readable storage medium.

BACKGROUND OF THE INVENTION

Automatic recommender systems are often used to assist users in selecting items that fit their taste. From a large set of items that a person can choose from, a recommender system makes a selection that fits the taste of a given user.

Before a recommender system can give truly personalized recommendations, it will first have to learn the user's taste. For this, the user typically has to rate a number of items, e.g., specify the extent to which he likes or dislikes a number of items.

Recommender systems can be broadly divided into two categories, namely content-based recommender systems and collaborative filtering-based recommenders. For the first type, items have to be characterized by a number of features. For example, a movie can be characterized by the title, the genre, the director, the cast, etc. The rating history of a user (the specification of likes and dislikes of a number of items) can then be used to estimate the correlation between feature-values and the probability that the user will like an item with these feature-values. In contrast, a recommender system using collaborative filtering uses ratings of a large community of users to extract from this a similarity between users (because they like/dislike the same items) or a similarity between items (because they are liked/disliked by the same users). This information is then used to either recommend items that are similar to the items that the user has specified to like or recommend items that are liked by users that are similar to the given user (and are not yet watched or bought by the given user). Collaborative filtering approaches do not need a characterization of the items in terms of feature-values.

Over the last years, the popularity of social network services, such as Facebook to and LinkedIn, has increased considerably. These services support a user to easily exchange ideas, interests, etc. with friends, family, and colleagues. These services also offer users the possibility to express their interests by "liking" entities, such as movies, music, celebrities, organizations, products, etc. Each of these entities is specified by a webpage that gives further details of the specific entity. For example, Facebook has an extensive collection of these entities that can be searched for by users.

Suppose that a user wants to express his or her interests for a given entity. If a webpage already exists for this entity, then the user can simply press on the corresponding "like" button, and a link to this webpage will be added to the user's profile. If no suitable webpage expresses the entity of his or her interest, the user can create such a webpage by additionally adding textual information about the entity. For many entities, this information is extracted from Wikipedia or other sources, providing detailed high-quality information.

For both categories of recommender systems mentioned above, a user that is new to the recommender system first has to rate a number of items before the recommender can generate useful personalized recommendations. This may hamper the wide-spread use of a recommender system, since users may not always be willing to initially invest time and effort in "explaining" the system their taste. Still, users expect immediate recommendations. A recommender system will be able to learn the taste of a user over time, but in that case the recommendations will initially be not optimally tuned to the specific user.

One way to address this issue is to let the recommender system initially recommend items that are liked by many users. However, a critical user may not appreciate these recommendations as very valuable, and he or she may stop using the recommender system before it has been able to tune its recommendations.

Another approach is found in Chumki Basu ET AL: "Technical paper recommendation: A study in combining multiple information sources", Journal of Artificial Intelligence Research 1, 1 Jan. 2001 (2001-01-01), pages 231-252. In this article the use of he WHIRL system is proposed to retrieve hits from multiple information sources.

SUMMARY OF THE INVENTION

According to a first aspect of the present invention, a recommender engine for recommending content items to a user, comprises a profile generation unit having a pre-profile input, which is configured to receive from a data base, which is external to the recommender engine, pre-profile data comprising pre-profile text data suitable for identifying entities of interest to a given user, and having a pre-profile analysis unit, which is connected with the pre-profile input and configured to extract from the pre-profile data identification data identifying the entities of interest and to generate an initial user profile data set for the given user from the extracted identification data;

a query generation unit, which is connected with the profile generation unit and configured to generate, using the extracted identification data from the initial user profile data set, at least two queries semantically different from each other to be directed to at least one content repository;

a content retrieval unit, which is connected with the query generation unit and configured to issue the generated queries to the at least one content repository and which is configured to receive from the at least one content repository, in response to the query, content-related response data comprising respective hit lists having at least one respective content-location identifier indicative of a storage location of a respective content item; and an interleaver unit, which is connected with the content retrieval unit and which is configured to generate from the different hit lists a single recommendation list by interleaving the content-location identifiers comprised in different ones of the hit lists with each other.

The interleaver unit combines the hit lists resulting from the at least two explicit queries that are semantically distinct form each other. In other words, at least two hit lists are interleaved to generate the recommendation lists as opposed to using a single disjunctive query The explicit creation of multiple, semantically different queries that lead to distinct hit lists, creates the possibility to apply advanced interleaving algorithms on the separate lists, e.g. to achieve a sufficient degree of diversity in the resulting list.

The recommender engine of the first aspect of the invention is based on the concept of enabling the generation of recommendations of content items to a new user by automatically creating an initial user profile on the basis of user-related data, herein referred to as pre-profile data, which are received from an external data base. A new user of a recommendation engine may for instance provide access to data under his or her account in a data base of an electronic social network, examples of which are known under the trademarks Facebook or LinkedIn. Many other such electronic social networks exist.

An electronic social network contains user-specific data on entities, such as persons, artists, groups of persons, cities, countries, clubs, political parties, companies, ideas, theories, science, things of all kinds, games, works of art, e.g., pieces of music, movies, plays, articles, books, photos, prints, paintings, styles of art, events, activities, sports, etc. The term entity is used in the present application to refer to any such identifiable interest of a given user.

Accordingly, the recommender engine of the present invention strongly accelerates the process of learning the user's taste by enabling recommendations on the basis of the user's documented activity in an environment external to the recommender engine, such as an electronic social network. At the same time the invention recognizes and overcomes another major issue of early usage of a recommendation engine by a user by interleaving of recommendations from different content lists, herein also referred to as hit lists, retrieved by the recommender engine. This interleaving enhances the diversity of recommendations which is an important functionality requirement of a recommender engine, in particular for the top region of the recommendation list, as can be measured by the overall use frequency of recommendations generated. The recommendation engine of the present invention is thus enabled to present to the user in a single list recommendations not only of what the user already knows, but, by interleaving the recommendations resulting from two semantically different queries, a diverse set of recommendations.

Thus, by combining automated evaluation of imported pre-profile data and an interleaving of recommendations from different content hit lists for a given user, the recommendation engine of the present invention achieves a close adherence of the recommendations to actual interests and expectations of the user from a recommendation system right from the beginning, without requiring redactional input or initial interaction with the user regarding his or her taste. Both measures thus collaboratively accelerate the user-specific learning process of the recommender engine strongly right after the first interaction with the given user. For an interested user who is provided with recommendations close to his or her interests right from the start interacts more frequently and thus faster provides information required to refine the initial user profile data set. This in turn enhances the overall perception of quality and adequateness of the recommendations and delivers a better product experience for the user.

In the following, embodiments of the recommendation engine of the first aspect of to the invention will be described. The additional features of different embodiments may be combined with each other to form further embodiments, unless explicitly excluded in the present specification.

Preferably, the recommendation engine sorts recommendations according to relevance. To this end, the content retrieval unit is in one embodiment further configured to retrieve content text data associated with the respective content-location identifiers in response to the queries. This way, textual relatedness between the pre-profile data and the content text data can be used to automatically assess relevance. To this end, one embodiment comprises a ranking unit, which is connected with the content retrieval unit and which is configured to assign to the content-location identifiers, which were received in response to each of the at least two queries, relevance indicators based on a similarity criterion assessing a textual relatedness between the pre-profile text data and the content text data, to sort the hit lists according to relevance as expressed by the relevance indicators, and to provide the sorted hit lists to the interleaver unit.

Thus the ranking unit differs from other ranking approaches in that the ranking is not based on user profile (as in the prior art) but on the pre-profile data, e.g. on the basis of user-related data that can be retrieved for instance from social networks.

In another embodiment, the profile generation unit comprises a classification database, which allocates a respective class of entities according to at least one entity classification criterion to a respective set of at least one keyword to be included in a query.

wherein the profile generation unit is configured to allocate at least one class to the extracted identification data identifying a respective entity of interest in accordance with the classification database, and wherein the query generation unit is configured to generate the queries using the respective identification data and at least one of the keywords allocated to the respective class of the identification data in accordance with the classification database.

Advantages of this embodiment are illustrated by the following application example: knowing that an entity identified in the pre-profile data refers to a person, can result—by virtue of the recommender engine of the present embodiment—in a query, in which the name of the person is combined with the keyword "interview" or "biography". Issued to a content repository of a content provider, such as YouTube or Wikipedia, these queries may result in recommendations of videos containing an interview with the person or a website containing biographical material about the given person.

In a further embodiment, the pre-profile analysis unit is further configured to classify the pre-profile text data by its language and to provide at its output at least one language identifier indicative of a respective language used in the pre-profile text data. The classification database of the recommendation engine of this embodiment comprises the keywords in different languages. The query generation unit is configured to generate the queries using the keywords in the language corresponding to the language identifier. For example, if the entity concerns a French author, then the name of the author is combined with "écrit par" instead of "written by" in a query to find books that he or she has written. In a variant of this embodiment, the query generation unit is additionally configured to generate the queries using the keywords in a default language if no keywords in a specified other language are present in the classification database for the respective class.

To further improve the diversity of the recommendation list generated, the query generation unit is in one embodiment configured to include the extracted identification data of at least two entities of interest in the queries.

In another embodiment, the profile generation unit is configured to detect in the pre-profile data a resource link to a content resource at a network location of a wide-area data network, to access the content resource and to add text data available from the content resource to the pre-profile text data. Such links typically refer to entities that are semantically related to an originating "liked" entity. For example, if an originating "liked" entity is a film director, then links typically specify names of movies that he or she directed. For an author, they may specify the names of books he or she wrote. Links can also refer to related artists or the type of art movement with which the "liked" entity is typically associated. Hence, by generating specific queries that combine these parts with possibly different additional directing keywords such as "written by", "influenced by", etc., and by issuing these queries to the specific content repositories, a broad range of returned results is obtained using the various potential links that can be found in the textual description.

In a variant of this embodiment, the profile generation unit is either alternatively or additionally configured to scan the pre-profile data for segments highlighted by types of mark-up tags other than those identifying a link, such as bold appearance etc. and to include such segments in the queries as described before.

In order to further enhance the recommendation generation the profile generation unit of one embodiment of the recommendation engine is configured to extract from the pre-profile data different subsets of the pre-profile text data, which are distinguished from each other by their date of generation as assigned by the external data base, and to extract from the subsets the respective dates of generation of the subsets. This allows filtering of the subsets according to their date of generation. The ranking unit of this embodiment is in turn preferably configured to apply a weighting to the relevance indicator, the weighting increasing the relevance indicafor the more, the more recent the date of generation of a respective one of the subsets related to a given content location pertaining to a given entity of interest is.

In a further embodiment, the pre-profile analysis unit is configured to detect from the pre-profile text data the presence of keywords indicating that the given user or some other entity (typically a person) related to the given user according to the external data base likes an entity/item, and to assign a "like"-indicator to the respective entity/item in the initial user profile data set. The ranking unit of this embodiment is preferably configured to apply a weighting to the relevance indicator, the weighting increasing the relevance indicator if a given entity/item of interest has an associated "like"-indicator.

In a further embodiment of the recommendation engine, the ranking unit is configured to assess a value of textual relatedness between the pre-profile text data and the content text data. Preferably, textual relatedness is assessed using a calculation of a term-frequency-inverse-document-frequency weight, hereinafter tf-idf weight. An implementation of this embodiment may base the assessment on a set of words comprised in the pre-profile text data and in the content text data. For instance, words exceeding a predefined tf-idf weight may be identified and compared for the pre-profile text data on one side and in the content text data on the other side. Additionally or alternatively, a mathematically predefined similarity criterion of the td-idf weights for words occurring in both types of text data may be used to assess textual relatedness.

An additional or alternative approach to weighing relevance of hits is implemented in an embodiment, in which the ranking unit is configured to weigh the relevance indicators based on a similarity criterion assessing a textual relatedness between content text data of different content items retrieved in the queries. In this embodiment, the weighing decreases the relevance indicator if a content item to be assessed for relevance has a textual relatedness to a content item assessed immediately before, the textual relatedness exceeding a predetermined value. This embodiment further enhances the diversity of the generated recommendation list in that query results having a high mutual similarity according to their textual relatedness are assessed as not equally relevant, thus automatically favoring only one of the mutually similar query results for the single recommendation list to be generated.

In a further embodiment, the recommender engine further comprises an authentication unit, which is configured to receive via a user input interface user authentication data suitable for accessing the external database. The profile generation unit is configured to access the external database to retrieve the pre-profile data.

In order to continue the adaptation of the user profile another embodiment of the recommender engine further comprises a profile maintenance unit in addition to the profile generation unit. The profile maintenance unit is configured to extract additional identification data for an additional entity from the retrieved content text data. The profile maintenance unit is preferably further configured to add the extracted additional identification data to the user profile data set upon detecting a value of textual relatedness between the pre-profile text data and the content text data that exceeds a predetermined threshold value. The user profile is in this embodiment thus adapted further, by further maintenance of the initially generated user profile.

A second aspect of the present invention is formed by a content repository, comprising
    a content data base comprising content items in the form of data files stored at content locations;
    a recommender engine according to the first aspect of the present invention or according one of its embodiments disclosed in the present specification including the claims.

In the content repository of the second aspect of the second invention the content retrieval unit of the recommender engine is configured to issue the generated queries to the content data base. This is not to principally exclude issuance of the generated queries to other, external content data bases not comprised by the content repository of the present aspect of the invention. However, in an embodiment, the issuance of the queries is in fact restricted to the content data base of the content repository itself.

Embodiments of the content repository comprise at least one of the embodiments of the recommender engine according to the first aspect of the invention. The advantages of the content repository of the second aspect of the invention and its embodiments thus correspond to those described above in the respective context of the first aspect of the invention and will not be repeated in the present context.

According to a third aspect of the invention, a method for operating a recommender engine for recommending content items to a user, comprises
  receiving from a data base, which is external to the recommender engine, pre-profile data comprising pre-profile text data suitable for identifying entities of interest to a given user,
  extracting from the pre-profile data identification data identifying the entities of interest
  generating an initial user profile data set for the given user from the extracted identification data,
  generating, using the extracted identification data from the initial user profile data set, at least two queries semantically different from each other to be directed to at least one content repository;
  issuing the generated queries to the at least one content repository
  receiving from the at least one content repository, in response to the query, content-related response data comprising respective hit lists having at least one respective content-location identifier indicative of a storage location of a respective content item;
  generating from the different retrieved hit lists a single recommendation list by interleaving the content-location identifiers comprised in different ones of the hit lists with each other.

The method of the third aspect closely corresponds to the functionality of the recommender engine of the first aspect of the invention. Therefore, for a description of its advantages and embodiments, reference is made to the description of the recommender engine of the first aspect of the invention and its various embodiments in the present specification and claims.

A fourth aspect of the present invention is formed by a computer-readable storage medium storing executable program code, the program code implementing a method for controlling the operation of a recommender engine for recommending content items to a user according to the third aspect of the invention or one of its embodiments.

BRIEF DESCRIPTION OF THE DRAWINGS

Preferred embodiments of the invention are also defined in the dependent claims. The foregoing and other aspects of the invention will be apparent from and elucidated with reference to the embodiments described hereinafter. In the following drawings

FIG. 2 shows a flow diagram of a method for operating a recommender engine according to a further embodiment.

DETAILED DESCRIPTION

Figure 1:
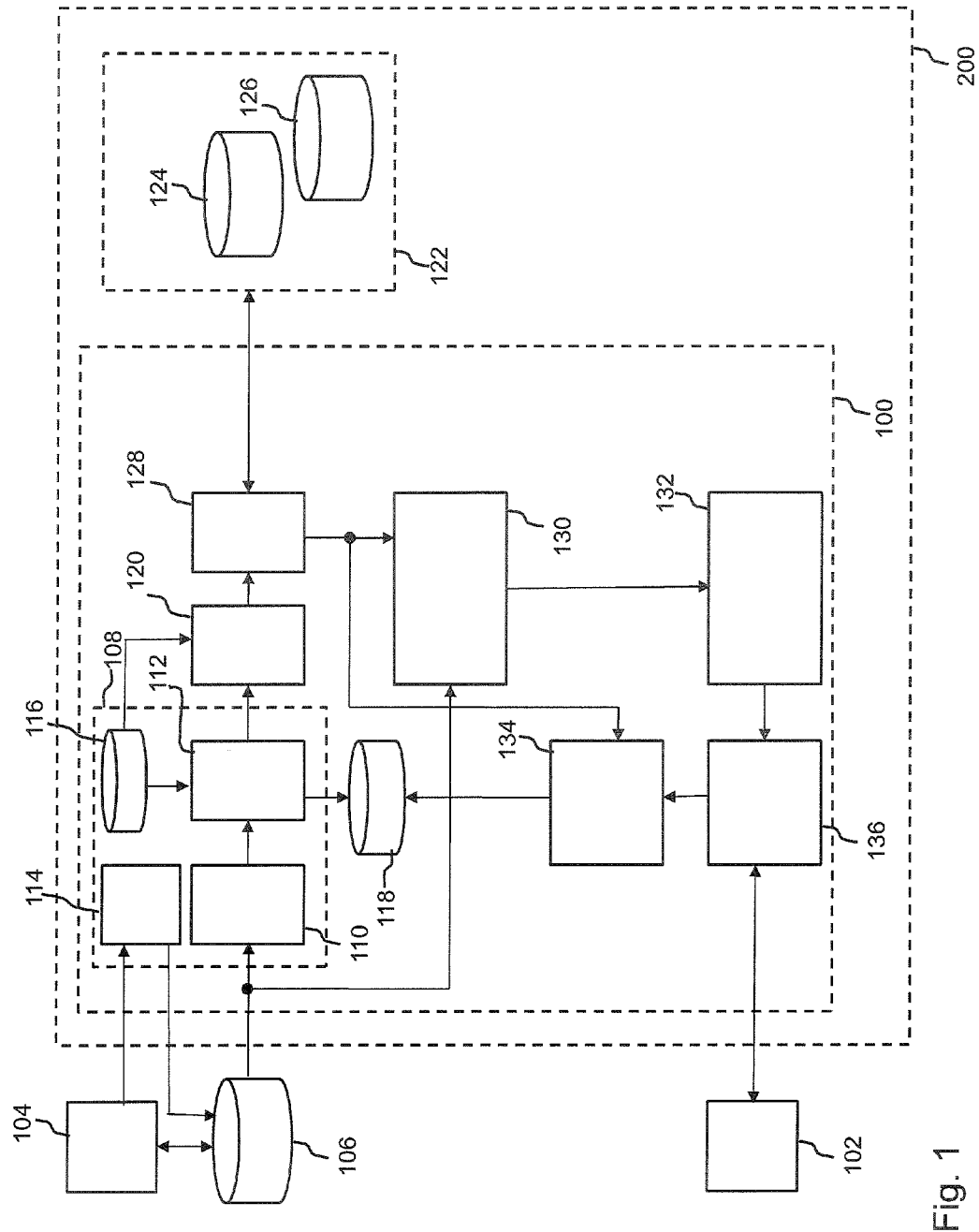
FIG. 1 shows a block diagram of a recommender engine, and of a content repository according to one embodiment.

FIG. 1 shows a block diagram of a recommender engine according to one embodiment. FIG. 1 will also be used further below to explain an embodiment of a content repository.

The recommender engine 100 of FIG. 1 generally serves for recommending content items to a user. The user operates a content display device 102. The recommender engine 100 of the present embodiment is operated as a device that is physically separate from the display device 100. In other words, in the present embodiment the display device is external to the recommender engine 100. In another useful embodiment, the recommender engine is integrated with the content display device 102. In any of these embodiments, the recommender engine 100 and the content display device 102 are communicatively connected with each other.

A communicative connection may also be established between the recommender engine 100 and a user terminal device 104, which typically is some form of a computer, such as a desktop computer, a mobile computer like a notebook, or a smartphone. The terminal device 104 and the content display device 102 are in many application cases integrated in one single device. However, for reasons of clarity with respect to the functionality in their interaction with the recommender engine 100, FIG. 1 shows them as separate blocks, also to point out that they may in fact be implemented on physically separate devices.

Terminal device 104 is configured to exchange information with a database 106 of an electronic social network. As is well known, a user may employ the terminal device 104 to input and thus transmit to the social network, that is for the purpose of the present description: to the database 106, his personal information, comments, favorite items ("likes"), links to websites, etc., and to receive similar input from other users (his "friends") of the social network.

The terminal device 104 may also be used to interact with the recommendation engine 100, as will be described further below.

The recommender engine 100 comprises a profile generation unit 108. The profile generation unit 108 is divided into a pre-profile input unit 110, which is communicatively connectable with the data base 106 or (not shown in FIG. 1) the terminal device 104, or both. The pre-profile input is configured to receive pre-profile data comprising pre-profile text data suitable for identifying entities of interest to a given user. For instance, the pre-profile data may comprise a personal "like" page, i.e., a code, typically in a markup language like html or xml, that specifies entities of interest to the user, by way of posts, comments, other types text or text fragments, links for display using a web browser software, and which is maintained by the user via his inputs to data base 106 also using a web browser interface presented to the user by a provider of the social network.

The profile generation unit 108 further comprises a pre-profile analysis unit 112, which is connected with the pre-profile unit 110 input and configured to extract from the pre-profile data identification data identifying the entities of interest and to generate an initial user profile data set for the given user from the extracted identification data. For instance, a webpage that specifies an entity that is "liked" by a given user typically contains a number of features that are almost always present, such as a category, an image of the entity, and a number of users that have "liked" the entity. The text that specifies the category is typically free text, i.e. it can be any text fragment, but the most occurring categories, such as e.g. "musician/band" or "public figure" can be recognized. In addition, the parts of the "like" page that contain large text fractions are extracted. These are usually denoted as "description", "about", etc. These text fragments are scanned for specific mark-up tags, indicating links, highlighted, bold etc. parts. These parts typically refer to entities that are semantically related to the originating "liked" entity. For example, if the originating "liked" entity is a film director, then these parts may specify the names of movies that he or she directed. For an author, they may specify the names of books he or she wrote. But, these specific parts can also refer to related artists or the type of art movement with which the "liked" entity is typically associated. Additionally, many social media, such as Facebook, YouTube and Twitter, allow users to "post" comments and information on the social media, also related to items, to update friends about one's activity or interests. The information contained in a post or comment and the "like" (not necessarily belonging to the user posting the comment, but to a friend) to which these posts and comments are associated and can also be used as pre-profile data by the pre-profile analysis unit in the process of generating an initial user profile data set to be used for generating first recommendations to the user.

To identify whether the comment of a friend on a "liked" entity should be interpreted as positive or negative, the sentiment of the comment can be analyzed in a variant of the present embodiment, for example by the pre-profile analysis unit 112 looking for the occurrence of words that are typically associated with positive sentiment and words that are typically associated with negative sentiment.

An option for the acquisition of pre-profile data is to equip the recommendation engine with an authentication unit, which is configured to receive via a user input interface user authentication data suitable for accessing the database 106. Thus a user discloses his user authentication information required for accessing data base 106 to the recommendation engine 100 via authentication unit 114. In this case, the profile generation unit 108 is configured to access the external database 106 to retrieve the pre-profile data, employing the user authentication data.

However, the provision of authentication unit 112 is a not necessary feature of recommendation engine 100. The pre-profile data may be provided by the user itself via his or her terminal device 104. For instance, the user may first download a copy of the personal data from a respective social network and then provide the copy as the pre-profile data to the recommender engine via pre-profile input unit 110.

The profile analysis unit 112 of the profile generation unit 108 of the recommender engine 100 is additionally configured to allocate at least one class to the extracted identification data identifying a respective entity of interest in accordance with a classification database 116. Classes of entities may for instance differentiate entities by assigning attribute such as person, artist, groups of persons, city, state, country, organization, club, political party, company, idea, theory, science, thing (of any kind), game, work of art, e.g., piece of music, movie, play, article, book, photo, print, painting, style of art, event, activity, sport, etc. The classification database 116 additionally allocates a respective class of entities to a respective set of at least one keyword to be included in a query.

The classification database 116 advantageously comprises the keywords in different languages. This allows serving the user with recommendations in his preferred language selected from a number of languages available, as will be explained further below. On the side of the profile generation unit, this feature is support by the pre-profile analysis unit 112 being further configured to classify the pre-profile text data by its language and to provide at its output at least one language identifier indicative of a respective language used in the pre-profile text data.

The initial user profile data set generated by the profile generation unit is stored in a user profile database 118.

The recommender engine 100 further comprises a query generation unit 120. The query generation unit 120 is connected with the profile generation unit 108 and configured to generate, using the extracted identification data from the initial user profile data set, at least two queries semantically different from each other to be directed to at least one content repository. Two different content repositories represented in FIG. 1 under reference labels 124 and 126, and summarized for ease of graphical representation under reference label 122. For the purpose of the description of the present embodiment, it is assumed the content repositories are accessible by the recommender engine via a public communication network such as the internet. Examples of such content repositories are for instance free-access content sources such as YouTube or Wikipedia, but may also be access-restricted content sources such as commercial movie data bases.

By generating specific queries that combine parts identified as entity of interest by the profile generation unit 108 with different additional directing keywords such as "written by", "influenced by", etc., and by issuing these to the specific content repositories 122, a broad range of returned results is obtained using the various potential clues that were found in the textual description by the pre-profile analysis unit. In addition, since the language(s) used in the textual descriptions are identified, as mentioned before, this is advantageously used to generate the queries using the same language of the keywords as that used in those parts identifying an entity of interest. For example, if the entity concerns a French author and a corresponding "like" page, then it makes sense to combine the name of the author with "écrit par" instead of "written by" to try to find the books that he or she has written. The query generation unit 120 is to this end configured to generate the queries using the keywords in the language corresponding to the language identifier or, if no keywords in this language are present in the classification database for the respective class, in a default language.

A content retrieval unit 128, which is connected with the query generation unit 120, is configured to issue the generated queries to the at least one content repository 128 and to receive from the at least one content repository 128, in response to the queries, content-related response data comprising respective hit lists having at least one respective content-location identifier indicative of a storage location of a respective content item.

Note that the extensiveness of the description of the "liked" entity as retrieved by the profile generation unit 108 from the pre-profile text data will influence the diversity of the issued queries and the returned results. For example, assuming that a user of Facebook has specified that he or she "likes" the composer Mozart. The Facebook page on Mozart contains multiple links, for example, to cities as "Salzburg" and "Vienna", but also to "Requiem" and "Constanze". The diversity of these terms, which may be combined in queries with "Mozart", gives very diverse results. In particular, in this case, queries containing the keywords "Vienna" or "Salzburg" may return results that have nothing to do with Mozart. Therefore an additional step is advantageous to filter out irrelevant results that should not be recommended. Accordingly, the recommender engine of the present embodiment comprises a ranking unit 130, which is connected with the content retrieval unit and which is configured to assign to the content-location identifiers, which were received in response to each of the at least two queries, relevance indicators based on a similarity criterion assessing a textual relatedness between the pre-profile text data and the content text data, to sort the hit lists according to relevance as expressed by the relevance indicators, and to provide at its output the sorted hit lists.

On the basis of the results retrieved in multiple queries, possibly to different content repositories, the recommender engine operates the ranking unit 130. The objective of ranking is that the top of the final list of recommendations should give a set of relevant results. The relevance of a result is established by determining the textual relatedness of a result with the originating "liked" entity. There are a number of approaches known in the art to identify textual relatedness. The approach known as tf-idf, which was mentioned already earlier in the present specification, is often used in practice. It is also common to use a vector space model, in which each text (or document) is represented by a multi-dimensional vector, where each dimension corresponds to a word that occurs in the text. The entry of such a word-vector is computed by multiplying the relative term frequency (tf), i.e., the number of times that the given word occurs in the text, divided by the total number of words in the text, by the inverse document frequency (idf), which expresses how often a word occurs in a document of a given corpus of documents. Note that a corpus is language specific. As described earlier, the language of a text, from which queries are generated, is identified and may be used to select the proper corpus to compute inverse document frequency. In this way, both the text of the originating "liked" entity and the text that corresponds to a given result can be represented as vectors in a high-dimensional space and the cosine between these vectors can be used as measure of their textual relatedness.

For implementing the ranking, we can do the following. Let $q1, \ldots, qn$ be the list of queries that have been sent to the content repositories and, for each qi, let R(qi) denote the list of results returned on issuing qi. Now, for each qi, we can order the results in R(qi) in order of decreasing textual relatedness to the originating "liked" entity.

Ranking may in some variants also involve the application of a weight to the assessed relevance indicator. On the basis of extracted dates of generation of different entries made by a user to the data base 106, the ranking unit 130 may apply a weighting to the relevance indicator according to the age of the respective user entry. In other words, the weighting increases the relevance indicator the more, the more recent the date of generation of a respective one of the subsets related to a given content location pertaining to a given entity of interest is. For instance, "liked" entities can contain news feeds, reporting on recent news of the corresponding entity. Also there, preference may be given by appropriate weighting to more recent additions to the "liked" entity, for reranking results, or even for preselecting more recent text fragments for query generation. In another variant, the pre-profile analysis unit is configured to detect from the pre-profile text data the presence of keywords indicating that the given user or someone related to the given user likes an entity. A "like"-indicator may thus be assigned to the respective to entity in the initial user profile data set, and the ranking unit may apply a weighting to the relevance indicator, the weighting increasing the relevance indicator if a given entity of interest has an associated "like"-indicator.

The provision of a ranking unit is not mandatory for the recommender engine. Ranking by the recommendation engine may for instance be omitted in the process of generating the single recommendation list, if the content repositories already apply a ranking to their hit lists on the basis of the terms used for the query. Also, ranking may be implemented as an option that can be switched on or off by the user.

In order to obtain a single list of recommendations that provides diversity in its entries, the recommendation engine 100 contains an interleaver unit 132. The interleaver unit 132 is connected with the content retrieval unit 128 (in the present embodiment through ranking unit 130), and is configured to generate from the different hit lists a single recommendation list by interleaving the content-location identifiers comprised in different ones of the hit lists with each other. Interleaving the ordered lists of results of the different queries may for instance be performed by using a round-robin approach or by using a more advanced credit-based scheduling approach.

The interleaving is one embodiment based an assessment of the textual relatedness of the results obtained from different queries. The interleaving unit is configured to weigh the relevance indicators based on a similarity criterion assessing a textual relatedness between content text data of different content items retrieved in the queries, wherein the weighting decreases the relevance indicator if a content item to be assessed for relevance has a textual relatedness to a content item assessed immediately before, which textual relatedness exceeds a predetermined value. Also by this implementation it is ensured that at least the top of the final list of recommendations contains enough diversity.

In addition to help bridging the initial period where the recommender engine 100 still has to learn the taste of a user, an acceleration the learning process of the recommender system may be achieved as follows. The results that are identified as sufficiently relevant—for example, because the cosine similarity of their description with that of the "liked" entity is sufficiently high—can be interpreted as likes by the recommender. This can directly result in a relatively large set of likes. For a recommender engine that uses a collaborative filtering approach, these could be directly added as likes in a user-item table. For a content-based recommender system, these "likes" can be translated into changes of a like-degree of feature-value pairs, provided that these features can be identified from the results. This can be realized if the result is recognized as an entry in a database that stores feature-values pair information about content items. To enable such improved learning process, the recommendation engine 100 of the present embodiment also comprises a profile maintenance unit 134. The profile maintenance unit is configured to adapt the initial user profile data set stored in user profile data base 118 in the further process of usage. To this end, the profile maintenance unit is configured to extract additional identification data for an additional entity from the retrieved content text data, and to add the extracted additional identification data to the user profile data set upon detecting a value of textual relatedness between the pre-profile text data and the content text data that exceeds a predetermined threshold value.

Further maintenance may be based on known algorithms employing detected user interactions. To enable such user interaction, an interface 136 is provided for delivering to the display device 102 the generated single recommendation list provided by the interleaving unit 132, typically in the form of data allowing a graphical representation of the recommendation list to enable intuitive user interaction for selection, deselection or another type of valuation of recommended items by the user. Such user input is evaluated by the profile maintenance unit 134.

The recommender engine may be implemented in hardware, using dedicated circuitry for the different functional units of the recommender engine. In another embodiment, the recommender engine is implemented in a computer hardware, using one or more program-controlled processors to implement the different functional units of the engine.

FIG. 1 is also suitable for illustrating an embodiment of a content repository 200 according to the present invention. In the content repository, the recommendation engine and at least one content database 122 are operated by the same provider. An access to content data bases beyond the internal content data base 122 of the content repository 200 in accordance with the previous description may or may not be implemented, according to the business model of the provider. Thus, the content repository 200 may restrict recommendations to content items contained in the content data base of the provider. By employing the recommendation engine together with the content data base, an attractive way of advertising content items to users of a content repository is created.

FIG. 2 shows a flow diagram of a method for operating a recommender engine for recommending content items to a user according to an embodiment of the present invention. The embodiment comprises the following steps:

Step S1: receiving from a data base, which is external to the recommender engine, pre-profile data comprising pre-profile text data suitable for identifying entities of interest to a given user;

Step S2: extracting from the pre-profile data identification data identifying the entities of interest;

Step S3: generating an initial user profile data set for the given user from the extracted identification data;

Step S4: generating, using the extracted identification data from the initial user profile data set, at least two queries semantically different from each other to be directed to at least one content repository;

Step S5: issuing the generated queries to the at least one content repository;

Step S6: receiving from the at least one content repository, in response to the query, content-related response data comprising respective hit lists having at least one respective content-location identifier indicative of a storage location of a respective content item; and Step S7: generating from the different retrieved hit lists a single recommendation list by interleaving the content-location identifiers comprised in different ones of the hit lists with each other.

Another embodiment of a process of generating recommendations on the basis of a given "like" page, such as a webpage that specifies entities of interest, comprises the following steps.

1. The text of the webpage is analyzed, by extracting a category of an entity and by extracting specific text fragments from the text.

2. This step is implemented by following either 2a or 2b or both:

2a. Queries are generated using the category of liked entity and using the extracted text fragments. These queries are sent to online content repositories, such as e.g. YouTube and Amazon, using an API that these repositories offer for this type of usage.

2b. Instead of sending queries to a possibly external content repository, one can alternatively match the extracted text fragments and the category of the liked entity with entries in an internal content repository, where there is have full control over how the matching is implemented.

3. The results that are returned by the online repositories are analyzed to determine for each of these results the semantic relatedness with the originating "liked" entity. In addition, as an option, the mutual similarity between each pair of results may be analyzed. Both analyses are based on comparing their textual similarity.

4. Subsequently, the results are combined into a single list of recommendations, with the goal to have in the top of the list results that are semantically highly related to originating "liked" item but are mutually sufficiently different.

5. As an option, Results with a high enough textual similarity with the originating "liked" entity can be directly included as "likes" to the recommender system, such that the process of learning the user's profile is accelerated.

In summary, the invention allows generating personal and diverse recommendations especially for new users that start to use a recommender system. Therefore, the period in which the recommender has not yet learned the taste of the user, due to a lack of ratings by the new user, is bridged. A user may log into the recommender system by using his or her social network service account and by giving the recommender system permission to use the "likes" that the user has specified earlier. In this way, the recommender is given sufficient time to learn the taste of the user while the list of ratings increases.

By appropriately using the APIs of different content repositories, one can use the invention to recommending various types of content, including movies, TV shows, books, articles, digital documents, etc., thus very different entities, including persons and general interests.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A recommender engine having one or more program-controlled processors to implement functional units for recommending content items to a user, the functional units comprising a profile generation unit having a pre-profile input unit to receive pre-profile data comprising pre-profile text data suitable for identifying entities of interest to a given user, and having a pre-profile analysis unit, which is connected with the pre-profile input unit to extract from the pre-profile data identification data identifying the entities of interest and to generate an initial user profile data set for the given user from the extracted identification data;

a query generation unit, which is connected with the profile generation unit to generate, using the extracted identification data from the initial user profile data set, at least two queries semantically different from each other to be directed to at least one content repository;

a content retrieval unit, which is connected with the query generation unit to issue the generated queries to the at least one content repository and to receive from the at least one content repository, in response to the queries, content-related response data comprising respective hit lists having at least one respective content-location identifier indicative of a storage location of a respective content item;

an interleaver unit, which is connected with the content retrieval unit to generate from the different hit lists a single recommendation list by interleaving the content-location identifiers comprised in different ones of the hit lists with each other, wherein the profile generation unit comprises a classification database, which allocates a respective class of entities according to at least one entity classification criterion to a respective set of at least one keyword to be included in a query; the classification database comprising the keywords in different languages;

the profile generation unit allocates at least one class to the extracted identification data identifying a respective entity of interest in accordance with the classification database;

the query generation unit generates the at least two queries using respective identification data and at least one of the keywords allocated to the respective class of the identification data in accordance with the classification database in the language corresponding to the language identifier or, if no keywords in this language are present in the classification database for the respective class, in a default language; and the pre-profile analysis unit further classifies the pre-profile text data by its language and provides at its output at least one language identifier indicative of a respective language used in the pre-profile text data.

2. The recommender engine of claim 1,
wherein the content retrieval unit retrieves content text data associated with the respective content-location identifiers in response to the queries; the recommender engine further comprising
a ranking unit, which is connected with the content retrieval unit and which
assigns to the content-location identifiers, which were received in response to each of the at least two queries, relevance indicators based on a similarity criterion assessing a textual relatedness between the pre-profile text data and the content text data,
sorts the hit lists according to relevance as expressed by the relevance indicators, and
provides the sorted hit lists to the interleaver unit.

3. The recommender engine of claim 2,
wherein the profile generation unit extracts from the pre-profile data different subsets of the pre-profile text data, which are distinguished from each other by their date of generation as assigned by an external data base, and extracts from the subsets the respective dates of generation of the subsets, and
wherein the ranking unit applies a weighting to the relevance indicator, the weighting increasing the relevance indicator the more recent the date of generation of a respective one of the subsets related to a given content location pertaining to a given entity of interest is.

4. The recommender engine of claim 2, wherein the ranking unit or the interleaving unit assesses a value of textual relatedness between the pre-profile text data and the content text data.

5. The recommender engine of claim 2, wherein
the interleaving unit weighs the relevance indicators based on a similarity criterion assessing a textual relatedness between content text data of different content items retrieved in the at least two queries, wherein the weighting decreases the relevance indicator if a content item to be assessed for relevance has a textual relatedness to a content item assessed immediately before, which textual relatedness exceeds a predetermined value.

6. The recommender engine of claim 4, further comprising a profile maintenance unit to extract additional identification data for an additional entity from the content text data, and to add the extracted additional identification data to the initial user profile data set upon detecting a value of textual relatedness between the pre-profile text data and the content text data that exceeds a predetermined threshold value.

7. The recommender engine of claim 1, wherein the query generation unit includes the extracted identification data of at least two entities of interest in the at least two queries.

8. The recommender engine of claim 1, wherein the profile generation unit detects in the pre-profile data a resource link to a content resource at a network location of a wide-area data network, accesses the content resource and adds text data available from the content resource to the pre-profile text data.

9. The recommender engine of claim 1, wherein the pre-profile analysis unit detects from the pre-profile text data a presence of keywords indicating that a given user or someone related to the given user likes an entity and to assign a "like"-indicator to the respective entity in the initial user profile data set, and wherein the ranking unit applies a weighting to the relevance indicator, the weighting increasing the relevance indicator if a given entity of interest has an associated "like"-indicator.

10. The recommender engine of claim 1,
further comprising an authentication unit to receive via a user input interface user authentication data suitable for accessing the external database,
wherein the profile generation unit accesses an external database to retrieve the pre-profile data.

11. The recommender engine of claim 1, further comprising a ranking unit, which is connected with the content retrieval unit and which sorts the hit lists to provide the sorted hit lists to the interleaver unit.

12. A content repository, comprising
a content data base comprising content items in the form of data files stored at content locations;
a recommender engine according to claim 1,
wherein the content retrieval unit of the recommender engine issues the generated queries to the content data base.

13. A method for operating a recommender engine having one or more program-controlled processors to implement functional units for recommending content items to a user, the method comprising
receiving from a data base, which is external to the recommender engine, pre-profile data comprising pre-profile text data suitable for identifying entities of interest to a given user;
extracting from the pre-profile data identification data identifying the entities of interest;
classifying the pre-profile text data by its language and providing at least one language identifier indicative of a respective language used in the pre-profile text data;
generating an initial user profile data set for the given user from the extracted identification data;
providing a classification database allocating a respective class of entities according to at least one entity classification criterion to a respective set of at least one keyword to be included in a query; the classification database comprising the keywords in different languages;

allocating at least one class to the extracted identification data identifying a respective entity of interest in accordance with the classification database;

generating, using the extracted identification data from the initial user profile data set and at least one of the keywords allocated to the respective class of the identification data in accordance with the classification database in the language corresponding to the language identifier or, if no keywords in this language are present in the classification database for the respective class, in a default language, at least two queries semantically different from each other to be directed to at least one content repository;

issuing the generated queries to the at least one content repository;

receiving from the at least one content repository, in response to the query, content-related response data comprising respective hit lists having at least one respective content-location identifier indicative of a storage location of a respective content item; and generating from the different retrieved hit lists a single recommendation list by interleaving the content-location identifiers comprised in different ones of the hit lists with each other.

14. A computer-readable non-transitory storage medium storing executable program code, the program code implementing a method for controlling the operation of a recommender engine for recommending content items to a user according to claim 13.

* * * * *